(12) United States Patent
Guerreiro

(10) Patent No.: US 9,765,717 B2
(45) Date of Patent: Sep. 19, 2017

(54) GASEOUS FUEL CONVERSION SYSTEM FOR MARINE VESSELS, AND RELATED ACCESSORIES

(71) Applicant: Blue Gas Marine, Inc., Apex, NC (US)

(72) Inventor: Jose Miguel Patricio Guerreiro, Apex, NC (US)

(73) Assignee: Blue Gas Marine, Inc., Apex, NC (US)

( * ) Notice: Subject to any disclaimer, the term of this patent is extended or adjusted under 35 U.S.C. 154(b) by 0 days.

(21) Appl. No.: 14/590,967

(22) Filed: Jan. 6, 2015

(65) Prior Publication Data
US 2015/0192082 A1 Jul. 9, 2015

Related U.S. Application Data

(60) Provisional application No. 61/923,884, filed on Jan. 6, 2014.

(51) Int. Cl.
| | |
|---|---|
| *F02M 43/00* | (2006.01) |
| *F02D 41/14* | (2006.01) |
| *F02M 35/10* | (2006.01) |
| *F02M 63/02* | (2006.01) |
| *F02D 41/00* | (2006.01) |
| *F02D 19/02* | (2006.01) |
| *F02D 19/06* | (2006.01) |

(52) U.S. Cl.
CPC ........... *F02D 41/14* (2013.01); *F02D 41/009* (2013.01); *F02D 41/0025* (2013.01); *F02D 41/0027* (2013.01); *F02M 35/10* (2013.01); *F02M 43/00* (2013.01); *F02M 63/0275* (2013.01); *F02D 19/023* (2013.01); *F02D 19/0642* (2013.01); *F02D 2200/101* (2013.01); *F02D 2400/11* (2013.01); *Y02T 10/36* (2013.01)

(58) Field of Classification Search
CPC .... F02D 41/14; F02D 41/009; F02D 41/0025; F02D 41/0027; F02M 63/0275; F02M 35/10; F02M 43/00; F02M 43/04
See application file for complete search history.

(56) References Cited

U.S. PATENT DOCUMENTS

| | | |
|---|---|---|
| 4,340,549 A | 7/1982 | McKim |
| 4,527,516 A | 7/1985 | Foster |

(Continued)

OTHER PUBLICATIONS

ISR mailed Apr. 24, 2014 for international application No. PCT/US2015/010383.

*Primary Examiner* — Jacob Amick
(74) *Attorney, Agent, or Firm* — NK Patent Law, PLLC

(57) ABSTRACT

An engine assembly is provided. The assembly includes an internal combustion engine of the type having a air intake manifold and a fuel injector in fluid communication with a cylinder head of the engine and a gasoline or diesel fuel source, a supply line in communication with each channel of the air intake manifold and being in communication with a gaseous fuel source, the supply line further defining an adapter for controlling flow of gaseous fuel therethrough, and a control module for controlling the fuel injector and a valve, the control module being configured to enable the fuel injector when the engine is operating at a first predetermined operation condition and configured to enable the valve when the engine is operating at a second predetermined operation condition. A method of controlling the same is provided herein.

15 Claims, 10 Drawing Sheets

(56) References Cited

U.S. PATENT DOCUMENTS

| | | | |
|---|---|---|---|
| 5,370,097 A | * | 12/1994 | Davis .................. F02D 19/0631 |
| | | | 123/27 GE |
| 5,592,924 A | | 1/1997 | Audisio et al. |
| 5,713,336 A | | 2/1998 | King et al. |
| 5,890,459 A | | 4/1999 | Hedrick et al. |
| 5,996,558 A | | 12/1999 | Ouellette et al. |
| 6,382,182 B1 | | 5/2002 | Green et al. |
| 7,574,993 B2 | | 8/2009 | Gillespie et al. |
| 8,166,956 B2 | | 5/2012 | Ulrey et al. |
| 8,342,158 B2 | | 1/2013 | Ulrey et al. |
| RE44,082 E | | 3/2013 | Shafer et al. |
| 8,590,515 B2 | | 11/2013 | Young et al. |
| 2013/0081593 A1 | | 4/2013 | Coldren |
| 2013/0112171 A1 | * | 5/2013 | Matsukawa .......... F02M 55/025 |
| | | | 123/456 |

* cited by examiner

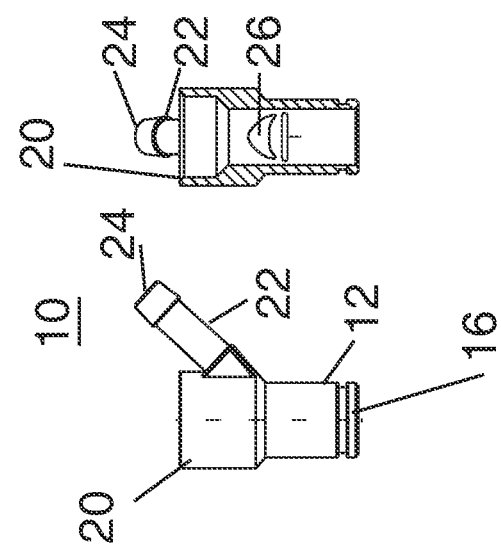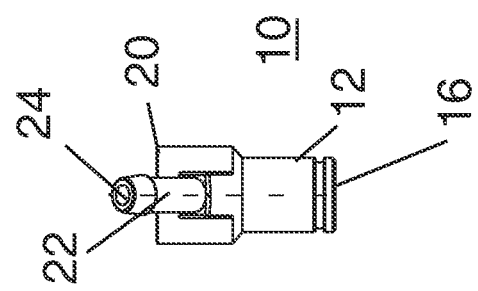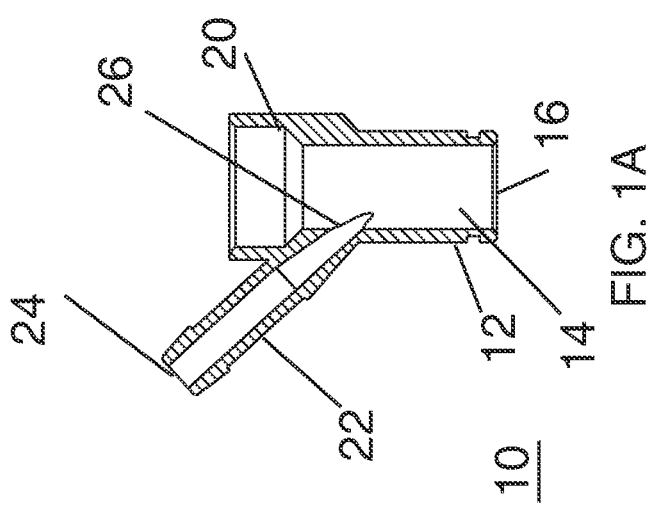

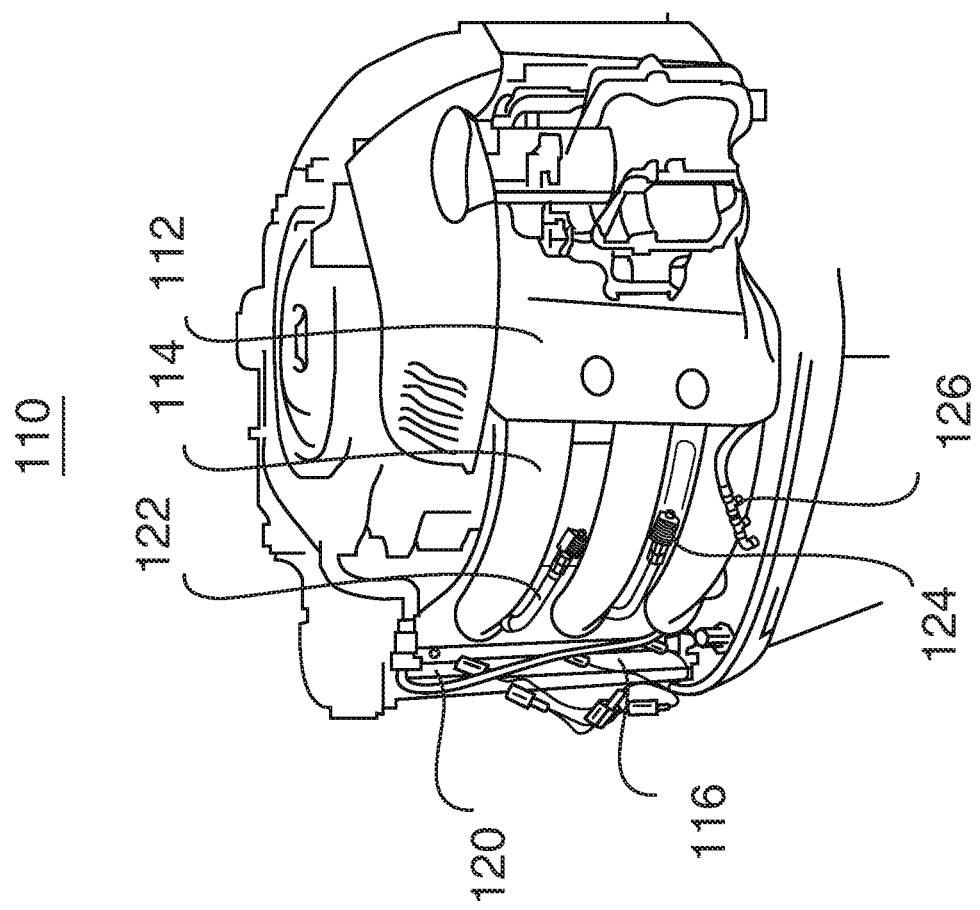

GASEOUS FUEL CONVERSION SYSTEM FOR MARINE VESSELS, AND RELATED ACCESSORIES

CROSS-REFERENCE TO RELATED APPLICATIONS

This application claims priority to U.S. Provisional Patent Application No. 61/923,884 filed on Jan. 6, 2014, the entire contents of which are incorporated by reference herein.

TECHNICAL FIELD

This disclosure is directed towards a natural gas conversion system for marine vessels, and, more particularly, towards a gaseous fuel conversion system and related accessories for producing improved marine vessel engines having reduced emissions and increased performance.

BACKGROUND

Natural gas is a clean burning fuel (relative to gasoline and diesel) with improved emission levels of hydrocarbons, nitrogen oxides ($NO_x$), carbon oxides (COx) and particulate matter. Increasing concern over exhaust emissions regulation and fuel efficiency has led to an interest in burning a combustible gaseous fuel, such as propane, hydrogen or natural gas in engines.

This interest is even more pronounced with regards to marine vessels. Marine vessels are many times less efficient than land-based vehicles due to the energy demands of cutting through water. This inefficiency has led to increased amounts of pollution, in particular as it relates to pollution of water bodies and adjacent air. Furthermore, increasing costs associated with gasoline and diesel fuels have dramatically increased the cost of operation for marine vessel operators.

Due to recent advances in technology for harnessing natural gas, natural gas has become an attractive alternative to gasoline and diesel fuels, however, upfitting and/or retrofitting an existing fleet of marine vessels with natural gas enabled technology has been overly expensive and a logistics challenge since it commonly requires replacing the existing engines with new engines. New dual-fuel engines exist only for very large ships, leaving the majority of boats without alternatives for burning cheaper and cleaner fuels.

Accordingly, a need exists for a solution to these problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein is a method to turn a gasoline marine engine (2-cycle or 4-cycle) into a dedicated Natural Gas engine or other gaseous fuel or into a hybrid that uses both Natural Gas (or other gaseous fuel) and Gasoline, allowing the boat operator to select which fuel to use, on demand and switch between fuels at the press of a button.

In one or more embodiments, a computer-based Engine Control Module (ECM) is installed in the engine compartment, in addition to those that may already come with the original engine. This ECM is powered by the original engine controls and receives various signals from the engine such as Rotations Per Minute, Gasoline Injector activation, Ignition, Air Intake Pressure In one or more embodiments, natural gas manifolds are installed in the engine compartment.

In one or more embodiments, electronic solenoids are connected to the Natural Gas manifolds with hoses.

In one or more embodiments, each solenoid is also connected to the plug-and-play valves with hoses.

In one or more embodiments, plug-and-play valves are installed into the fuel intake ports of each combustion cylinder in the engine. There may be provided one valve per cylinder.

In one or more embodiments, the original gasoline injectors are then inserted into the Plug-and-Play valve and each Natural gas hose from each Natural Gas solenoid injector is connected to this valve. This allows either Gasoline or Natural Gas to be injected into the same existing port.

In one or more embodiments, each solenoid is then connected with electrical wires to the ECM.

In one or more embodiments, electrical by-pass connectors are installed between the engine's fuel injectors and the engine's original electrical harness that controls those injectors. The by-pass connectors are also connected with electrical wires to the ECM. During gaseous fuel operation, all electrical signals that the original engine sends to the Gasoline injectors are intercepted by the by-pass connector and interrupted by the ECM, which turns off the Gasoline injectors during gaseous fuel operation. The ECM transforms the signal to the Gasoline injectors into signals that actuate the electronic solenoids, thus opening and closing them to allow the gaseous fuel to flow into each combustion cylinder with the correct timing and amount.

In one or more embodiments, air intake pressure sensors are installed into the engine's air-intake manifold and connected to the ECM, or the engine's Air Intake signal is routed to the ECM. This allows the ECM to control the amount of gaseous fuel flow for each level of Engine RPM.

In one or more embodiments, a single gaseous fuel tank is installed or a cluster of two or more tanks are installed with shutoff valves. Alternatively, an LNG tank or a set of LNG tanks are installed with a vaporizer unit to vaporize Liquefied Natural gas and with or without a vapor accumulator tank. All of which can provide the engine with a supply of Natural Gas in the gaseous form.

In the case of compressed gaseous fuels, pressure reducers and regulators are installed with hoses between the compressed fuel tank and the Natural Gas manifolds in the engine compartment. The pressure reducers contain solenoid actuators that allow Natural Gas to flow when actuated and are electrically connected to the ECM.

In one or more embodiments, the reducer(s) are configured to maintain a set pressure of Natural Gas flow into the engine.

In one or more embodiments, the ECM opens the pressure reducer valves during Natural Gas operation by sending electrical signals to the pressure reducer solenoid valve actuator of each fuel tank.

If tank clusters are installed, additional high-flow Natural Gas manifolds are installed between the regulators and the Natural Gas manifolds in the engine compartment and connected with hoses.

In one or more embodiments, a high-flow fuel filter is installed between the regulator(s) and the first gaseous fuel manifold to intercept solid particles that may clog the gaseous fuel solenoid injectors.

In one or more embodiments, a high-pressure sensor is installed between each tank shutoff valve and the pressure reducers. This sensor is then electrically connected to the ECM.

In one or more embodiments, an electrical water pump is installed to extract water from the body of water where the marine engine is running and pump it through the pressure reducer and back out. This will prevent freezing of the regulator due to the high flow of the gaseous fuel at high RPM levels.

In one or more embodiments, the ECM is then programmed so that the marine engine can automatically switch to gaseous fuel operation at predetermined RPM levels or at the press of a switch button by the operator. The ECM is also programmed to switch back to gasoline in the event that the operator presses the switch button or the gaseous fuel has run out.

In one or more embodiments, the ECM is wired such that during Gasoline operation it serves as a by-pass of electrical signals to the gasoline injectors, so in case any gaseous fuel system component malfunctions, the gasoline fuel-system continues to run independently from the malfunctioning gaseous fuel system.

In one or more embodiments, the ECM also controls a visual display where gaseous fuel levels and other characteristics of gaseous fuel combustion are shown

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIGS. 1A, 1B, 1C, and 1D are figures illustrating an injector valve assembly according to one or more embodiments disclosed herein;

FIGS. 3A, 3B, and 3C are perspective views illustrating an engine according to one or more embodiments disclosed herein;

DETAILED DESCRIPTION

Figure 2:
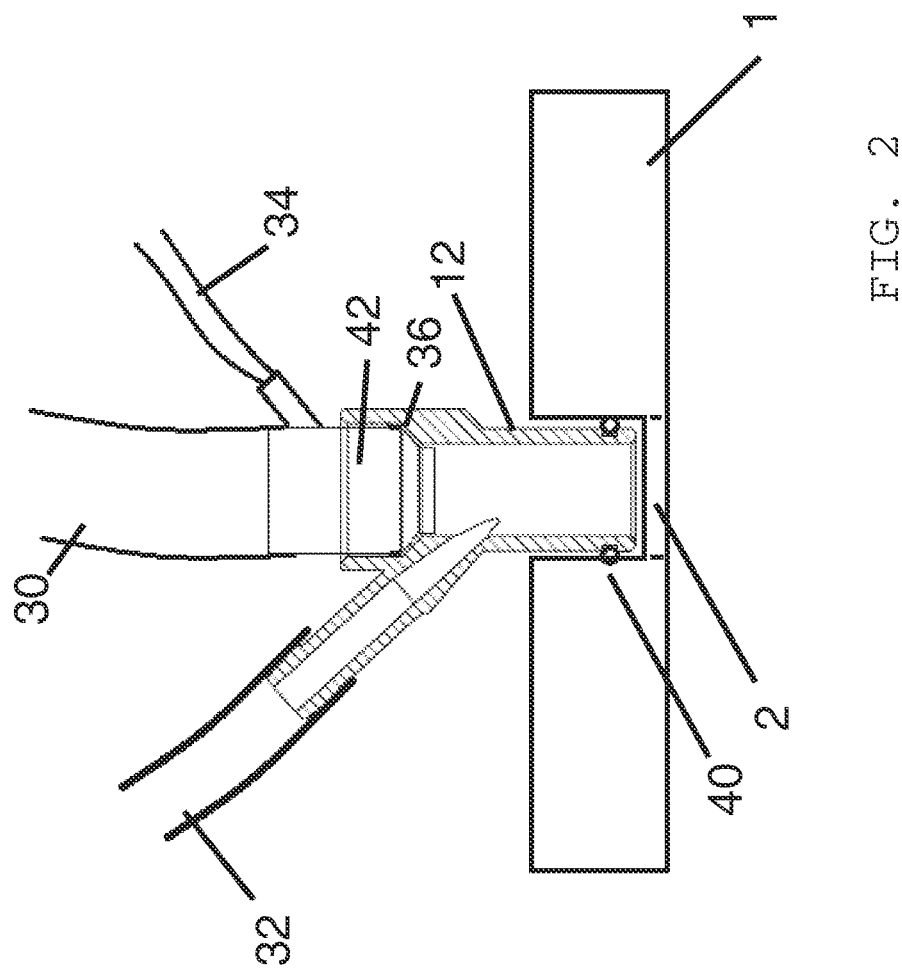
FIG. 2 is an illustration of an injector valve assembly installed in an engine cylinder head according to one or more embodiments disclosed herein.

The presently disclosed subject matter is described with specificity to meet statutory requirements. However, the description itself is not intended to limit the scope of this patent. Rather, the inventor(s) have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

FIGS. 1, 1B, 1C, and 1D illustrate an injector adapter 10 for use in converting an engine to use a gaseous fuel in addition to the original liquid fuel in the same engine. Examples of gaseous fuels tested with this adapter 10 are Natural Gas in the compressed form (CNG) and Liquefied Natural Gas (LNG) in the vaporized form. The adapter 10 includes a body portion 12 defining a chamber 14 therein and having a first end 16 configured for being received within the engine and a second end 20 configured for engaging with a fuel injector. A fuel passage inlet 22 having a first end 24 spaced-apart from the body portion 12 is configured for fluid communication with a natural gas supply. A second end terminates in an inlet opening 26 defined in the body portion 12. The inlet opening 26 defines an oblong shape and terminates in the body at a position below the bottom-most portion of the injector. In one or more experiments, the oblong shape definition has lead to increased and improved gaseous fuel flow when compared to other inlet shapes. The angle or direction of the inlet opening 26 in relation to chamber 14 has been shown to increase and improve the length of the gaseous stream, thus creating increased and improved combustion, resulting in faster engine acceleration and greater power output. The dimension of the inner diameter of the gaseous fuel passage inlet 22 is a key factor in maintaining the greatest power output relative to the original liquid fuel. This diameter is derived from the following equation:

$$\text{Inlet Diameter} = GFF * \sqrt[4]{\frac{\text{Cylinder Displacement}}{\text{Dynamic Pressure}}}.$$

Inlet Diameter is a variable representing the width of the inlet 22 measured in millimeters for gaseous fuel intake.

GFF is the Gaseous Fuel Factor, which is a constant value for the gaseous fuel at 25 degrees Celsius. For Natural Gas, this constant was empirically determined to be 1.811

Cylinder Displacement or swept volume is a variable representing the maximum volume of the combustion chamber, measured in cubic centimeters.

Dynamic Pressure is a variable representing the pressure at which the gaseous fuel is dispensed into the inlet 22 and is measured in pounds per square inch.

In this manner and as further illustrated in FIG. 2, the adapter 10 is "plug and play" in the sense that the adapter 10 can be positioned within the existing injection port opening 2 of the cylinder head 1 where the original injector 42 was, but when the "plug-and-play" adapter is introduced, the injector is instead inserted inside this adapter 10 and the flow of gaseous fuel comes in below the end of the existing injector 42 which is received in the adapter 10 end 20. The injector 42 may use an o-ring 36 on an end thereof for being received in the port opening 2 of the cylinder head 1, but when the "plug-and-play" adapter 10 is introduced, the injector 42 is instead inserted inside this adapter 10. The injector 42 is maintained in order for the ECM of the marine engine to allow for the injector 42 to continue injecting the original liquid fuel in addition to the gaseous fuel, or during dedicated gaseous-fuel operation the ECM will monitor signals from the wiring assembly to the injector 42 to determine injector activation timing, pulse rate and the like. The injector 42 remains attached to a liquid fuel supply line 30 and can be used to start, idle, or otherwise run the engine on the supplied fuel in the case of a retrofit which is typically diesel or gasoline. Additionally, gaseous fuel from adapter 10 and conventional diesel or gasoline provided through the injector may be intermixed for burning/combustion in the engine, or both fuels used independently of each other while sharing the same injection port opening of the cylinder head. A supply line 32 provides gaseous fuel to the adapter 12. Electrical control line 34 may provide signals for controlling the injector 42. The adaptor 12 may include o-ring 40 for providing a seating within the cylinder head 1.

This allows for an engine to be retrofit with the adapter 10 and converted to entirely or partially run off of a gaseous fuel, while still allowing for operation of the engine with conventional liquid fuels and with gaseous fuel systems, such as the one described in the Summary The adapter 10 may be injection molded with polymers or polymer composites, or may be fabricated from some other desired material or in some other desired manufacturing process.

With reference to FIG. 3A, 3B, 3C, and FIG. 6, a marine engine assembly 110 of six cylinders in a V-shape geometry with three cylinders on one side of the engine and three cylinders on the other is illustrated. This is a representative example, though many engines of various configurations may be used with the disclosure herein. The engine 110 in this example burns gasoline, which is electronically injected into each cylinder and air is supplied to such cylinder via an air intake manifold. This engine 110 has been retrofitted with a gaseous fuel system using Natural Gas disclosed herein. The engine assembly 110 includes an internal combustion engine 112 of the type having an air intake manifold 114 and a fuel injector 116 in fluid communication with a cylinder head 120 of the engine 112. The fuel injector 116 may be in communication with one of a gasoline or diesel fuel source. A gaseous fuel supply line 122 is in gaseous communication with each channel of the air intake manifold 114. The gaseous supply line 122 is also in communication with a gaseous form of natural gas (in compressed form such as CNG or vaporized LNG) source. The supply line 122 further defines a valve 124 for controlling flow of natural gas therethrough. The valve 124 may be an electrically controlled solenoid in appropriate embodiments. In one or more embodiments, the valve 124 may be controlled by a control module 130 (which may also be referred to herein as an ECM or ECU) and in these instances, the valve 124 includes electrical wiring extending to the control module 130. This apparatus described in this paragraph is repeated for each combustion cylinder, so for the engine assembly 110 which contains 6 cylinders it would be repeated six times. Each set of the gaseous fuel supply lines 122 is then connected to a gaseous fuel manifold 126 on each side of the engine containing combustion cylinders. In one or more embodiments, a pressure sensor 132 is in communication and carried by the fuel manifold 126 to detect pressure at the manifold and communicate the same to the ECM 140. The pressure sensor 132 may be carried on only one of the manifolds 126 or may be carried on each.

In other embodiments the supply line 122 is connected to adapter 10 in FIG. 2, more specifically to the inlet end 22, thus eliminating the need to modify the air intake manifold 114 of the engine to attach a fitting to connect it with supply line 122.

In certain embodiments (not illustrated here) the control module also enables an electric relay simultaneously with enabling fuel injector 116. The same relay is disabled when the control module disables fuel injector 116. Enabling and disabling this relay enables and disables the injector's liquid-fuel pump or series of liquid-fuel pumps. Certain engines contain a high-pressure fuel pump connected between the fuel injector and a feeder fuel pump and all three items are required to be disabled or simultaneously enabled.

The control module 130 is provided for controlling the fuel injector 116, the valve 124, a pressure reducer or reducers in case of clustered tanks 136 of gaseous fuel and a fuel-level gauge for gaseous fuel. In this manner, the control module 130 is configured to enable the fuel injector 116 when the engine is operating at a first predetermined operation condition under a certain RPM range and configured to enable the valve 124 and disable fuel injector 116 when the engine 112 is operating at a second predetermined operation condition.

In this manner, the first predetermined operation condition may be an engine RPM below a predetermined value and the second predetermined operation condition is an engine RPM above a predetermined value. In other words, the control module 130 is configured to shut off the fuel injector 116 and actuate the valve (referred to as gaseous injector in illustrations) 124 to the open position when the engine 112 transitions from the first predetermined operation condition to the second predetermined operation condition such that the engine 112 is cranked on gasoline or diesel from the respective gasoline or diesel fuel source but runs on the gaseous fuel at a desired higher RPM range.

In one or more embodiments, the control module 130 is configured to actuate the valve 124 to vary the duration of opening to vary the amount of gaseous fuel flowing therethrough.

Figure 3B:
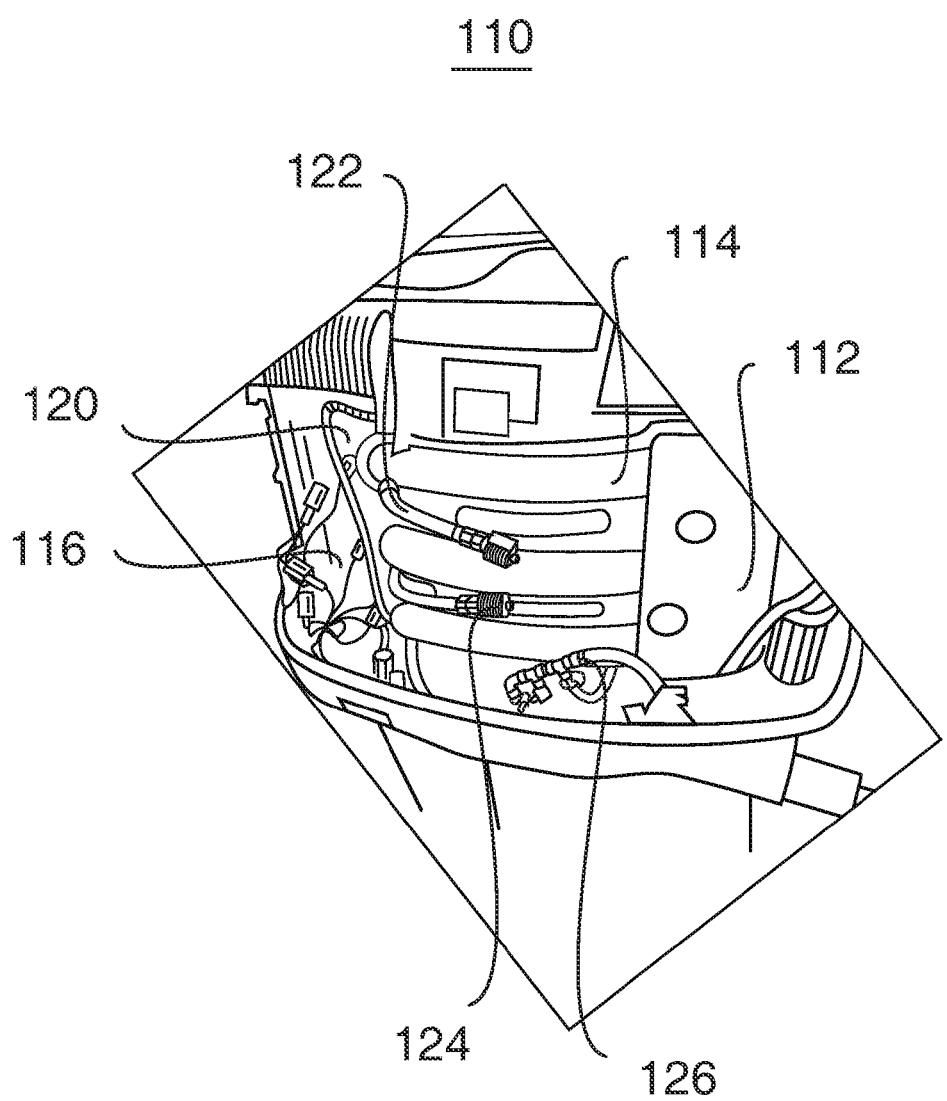
Figure 3C:
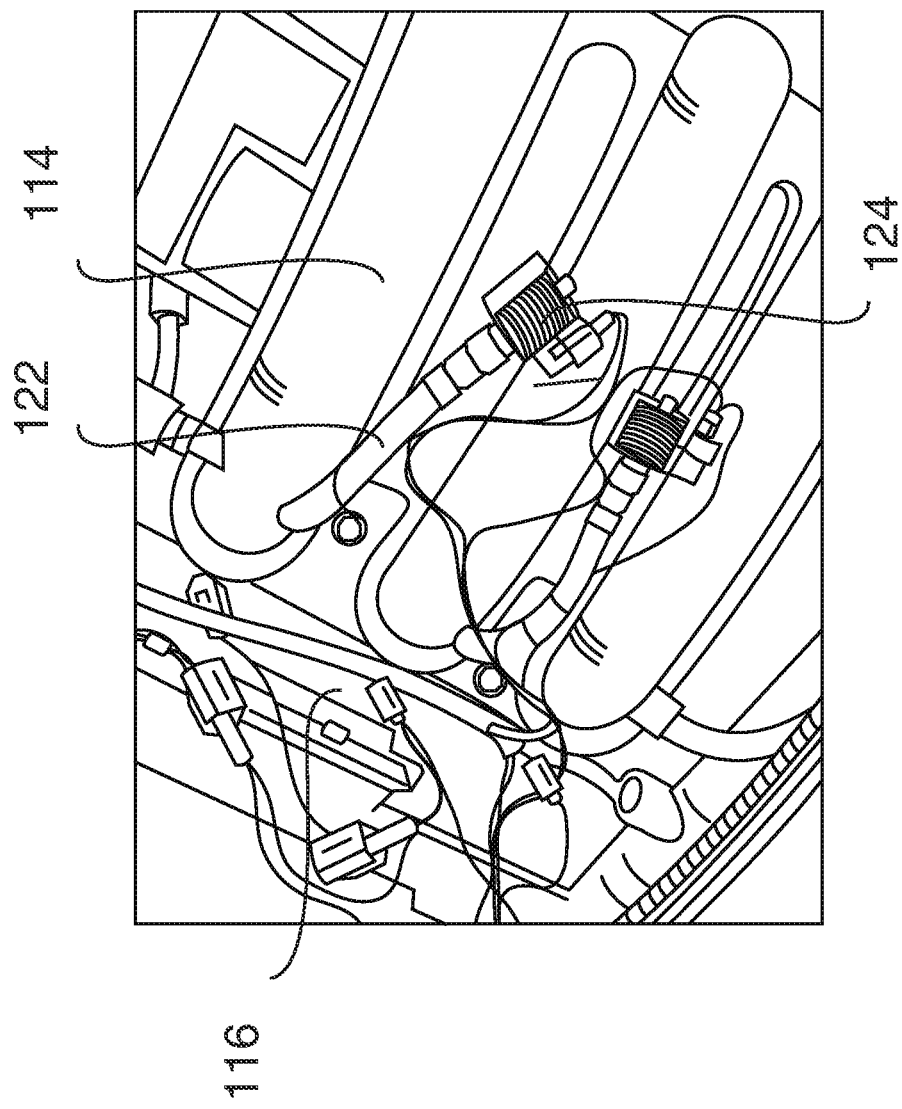

As illustrated in FIGS. 3B and 3C, the supply line 122 is defined at a portion of the air intake manifold 114 closely spaced to the cylinder head. In one or more embodiments, the supply line 122 is defined at a medial portion of the air intake manifold 114. In one or more embodiments, at least a portion of the gaseous fuel and air supply is intermixed as the air is aspirated into the combustion chamber of the cylinder. As illustrated, the engine is a marine engine in this one example, though any type of internal combustion engine may be employed. Marine engines are particularly suited for this technology because of the increased levels of fuel consumption typically required of such engines. At high RPMs, marine engines consume high amounts of gaseous fuel which causes the pressure reducer to become very cold as the gaseous fuel flows at high speeds, which causes freezing of that component and consequential temporary failure. This technology solves this problem by warming the pressure reducer with great quantities of water pumped from the same body of water where the marine engine is in operation. This is accomplished by the control module controlling the start and stop of an electric water pump which acts as a medium to warm up the pressure reducer through the action of an electrical water pump as described herein.

Figure 4:
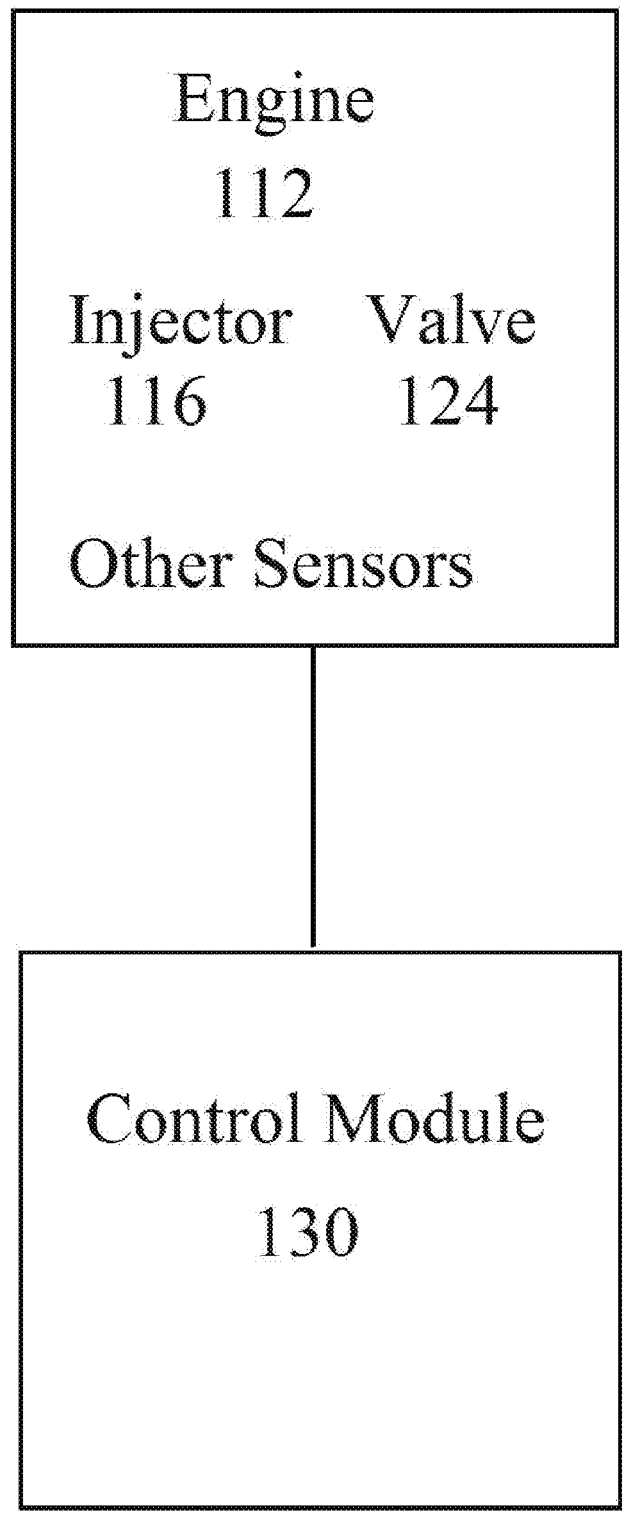
FIG. 4 is a schematic of a system for use with the systems disclosed herein according to one or more embodiments disclosed herein.

A schematic illustration of a control module and engine is illustrated in FIG. 4, with the control module being designated 130. The control module 130 is configured for communicating with the engine 110 by communicating with, in this particular example, injector 116 and valve 124. Other sensors such as exhaust gas recirculation, oxygen sensors, water sensors for the air mixture, and the like may be employed and additionally in communication with control module 130. In one or more embodiments, the control module 130 may be the existing control module that was installed with an engine being retrofit, or it may be an additional control module that communicates with the existing control module of the engine being retrofit, or it may be a control module that is provided to entirely replace the existing control module that was provided with the original engine being retrofit for gaseous fuel operation.

In certain embodiments, two types of components are added to those already in the engine, such as an ignition control module and induction ignition coils. The ignition control module is connected to several induction ignition coils to control spark timing and spark duration during gaseous fuel operation. These two types of components are in addition to those already in the original engine. The timing and duration of spark is thereby adjusted to increase power output and achieve a more complete combustion, therefore lowering combustion emissions. An ignition coil is used for each spark plug 118 in the engine. The ignition coils control the spark duration. The ignition control module controls the spark ignition timing. The control module (ECM) controls the ignition control module by enabling it during gaseous fuel operation and disabling it during original liquid fuel operation. When the ECM enables the ignition control module, it simultaneously disables the ignition coils from the original engine. The original ignition coils are enabled only when the ECM disables the ignition control module.

The control module 130 is configured to monitor engine RPM. This may be done in any manner of ways, including monitoring the pulsing frequency of the fuel injector 116, monitoring the sparks from a given sparkplug, communicating with a tachometer to measure the same, or any other appropriately configured method.

The control module 130 is configured for communicating with the engine 110 by communicating with, in this particular example, injector 116 and valve 124. Other sensors such as exhaust gas recirculation valves, oxygen sensors, water sensors for the air mixture, and the like may be employed and additionally in communication with control module 130. In one or more embodiments, the control module 130 may be the existing control module that was installed with an engine being retrofit, or it may be an additional control module that communicates with the existing control module of the engine being retrofit, or it may be a control module that is provided to entirely replace the existing control module that was provided with the original engine being retrofit for gaseous fuel operation.

In certain embodiments, two types of components are added to those already in the engine, such as an ignition control module and induction ignition coils. The ignition control module is connected to several induction ignition coils to control spark timing and spark duration during gaseous fuel operation. These two types of components are in addition to those already in the original engine. The timing and duration of spark is thereby adjusted to increase power output and achieve a more complete combustion, therefore lowering combustion emissions. An ignition coil is used for each spark plug 118 in the engine. The ignition coils control the spark duration. The ignition control module controls the spark ignition timing. The control module (ECM) controls the ignition control module by enabling it during gaseous fuel operation and disabling it during original liquid fuel operation. When the ECM enables the ignition control module, it simultaneously disables the ignition coils from the original engine. The original ignition coils are enabled only when the ECM disables the ignition control module.

The control module 130 is configured to monitor engine RPM. This may be done in any manner of ways, including monitoring the pulsing frequency of the fuel injector 116, monitoring the sparks from a given sparkplug, communicating with a tachometer to measure the same, or any other appropriately configured method.

Figure 5:
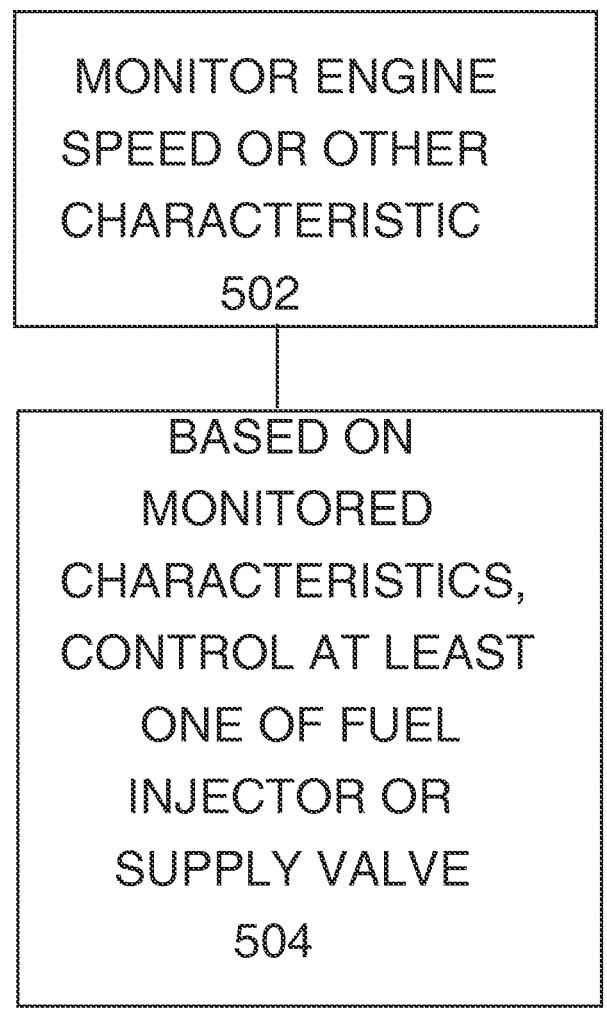
FIG. 5 is a flowchart depicting one or more methods of using the control module to control the operation of gaseous fuel flow using Compressed Natural Gas (CNG) or Liquefied Natural Gas (LNG) in an engine according to one or more embodiments disclosed herein.

FIG. 5 illustrates one or more methods of operation 500 of the control module 130. The module 130 monitors engine speed or some other characteristic 502. The module 130 may monitor the engine speed or some other characteristic 502 based on any readings from the one or more gauges provided. Based on the monitored characteristics, the control module 130 then directs one or both of the fuel injector and the supply line valve to operate in a desired manner 504. For example, during engine startup, the control module 130 may direct the fuel injector to operate in a normal operating condition, meaning the condition that the fuel injector would operate in an engine that has not been retrofit or provided with the gaseous fuel systems disclosed herein. This would allow the engine to crank and idle on traditionally provided fuels such as diesel or gasoline. After a desired RPM or other characteristic is reached, the control module may then direct the fuel injector to cease injecting gasoline or diesel and then direct the valve 124 to open to allow flow of a gaseous fuel through the supply line 122.

A method of priming an engine using the gaseous fuel technology disclosed herein may be provided and includes providing pumping forces to pump a gaseous fuel such as natural gas along the length of the supply line between the gaseous fuel tank or tank cluster and the engine, or the use of a device that creates a pressure differential within the supply line. The gaseous fuel priming is useful when completed prior to the engine entering into gaseous fuel operation. This may be particularly advantageous given the length of the supply line and the vacuum generally created in a gaseous fuel line. A pump or a pressure differential device may be provided to pump a predetermined amount of gaseous fuel into the supply line either before or right at engine turnover between the operation of the original liquid fuel and the operation of the engine under the gaseous fuel. The gaseous fuel priming may be controlled manually or automatically. In a manual mode, the person operating the engine presses a button that enables the operation of the pump or pressure differential device until the supply line is primed or full with the gaseous fuel at a set pressure. In automatic mode, the priming operation if started by the ECM when the operator presses the manual switch to change engine operation to a gaseous fuel or the ECM encountered a predetermined condition that triggers a change in engine operation to gaseous fuel. In this mode, the ECM enables the operation of the pump or pressure differential device until the supply line is primed or full with the gaseous fuel at a set pressure.

Figure 6:
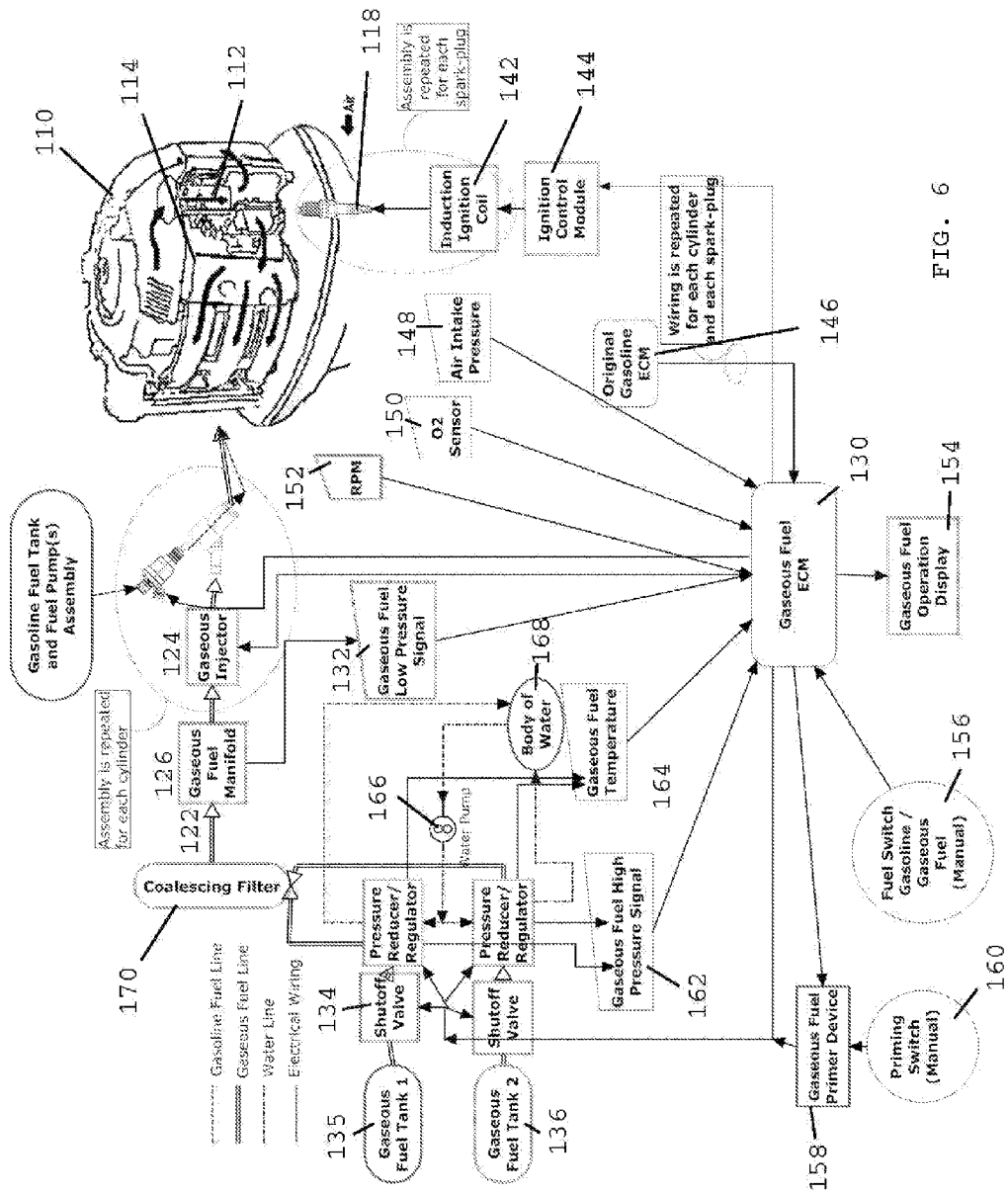
FIG. 6 is a schematic diagram of a system as described herein according to one or more embodiments disclosed herein.

With particular reference to the schematic illustrated in FIG. 6, the engine assembly 110 includes an engine 112, intake manifold 114, and fuel injector 116. Adapter 10 is provided by removing the existing fuel injector valve assembly from the cylinder head of the engine 112, inserting the adapter 10 into the cylinder head opening, connecting a gaseous fuel line to the supply line opening of the adapter 10 and inserting the existing fuel injector 116 into the adapter 10 opening. This is additionally illustrated with further reference to FIG. 2. In this manner, the fuel tank and fuel pump assembly remains in communication with fuel injector 116 and the engine 112 may be started or ran entirely off of the supplied with fuel source in the case of a retrofit, meaning continuing to run off of gasoline if a conventional gasoline marine engine in one example. In one or more embodiments, an induction ignition coil 142 and ignition control module 144 may be provided in communication with the ECM 130. An induction ignition coil 142 may be provided at each cylinder. The ECM 130 and ignition control module 144 may be configured to communicate and determine a preferred spark duration for the ignition coil 142. In this manner, for gaseous fuel situations such as LNG, a longer spark duration has been shown to provide improved combustion and efficiency. In addition, the ignition control module is also used to vary the timing of spark ignition during Natural Gas operation by several degrees before the piston of the engine's combustion chamber reaches top-dead-center. It has been determined that advancing the start of ignition during Natural Gas combustion increases engine performance and reduces emissions.

The original ECM 146 provided with the engine assembly 110 in the case of a retrofit may also communicate with the ECM 130 any desired characteristic that the original ECM monitors or controls. The ECM 130 may be in communication with an air intake pressure sensor 148. An O2 or similar sensor may be in communication with ECM 130 and provided for monitoring one or more characteristics.

An RPM sensor 152 may be in communication with ECM 130. The RPM sensor 152 may monitor RPMs of the engine 112 by any appropriately configured manner and, in one or more embodiments, is the RPM sensor 152 provided with engine 112 in the case of a retrofit. A display module 154 may be provided for displaying information to the engine operator.

A switch 156 may be provided and in proximity to the engine operator that allows for the operator to switch between gasoline or diesel conventional fuels and gaseous fuel. Alternatively, switch 156 may be controlled by the ECM 130 and is automatically operated.

A gaseous fuel primer device 158 and priming switch 160 may be provided and in communication with ECM 130. The fuel priming switch 160 may be provided for engagement by the operator and is configured to direct the primer device 158 to communicate with one of reducer/regulator 134 and/or shutoff valve 135. Priming may be advantageously provided with the system illustrated in FIG. 6 because of the length of gaseous fuel line that may be utilized in a marine setting. In one or more embodiments, fuel tanks 136 may be provided at a front or medial portion of the marine vessel. In order to avoid having high, unregulated pressure gaseous fuel in the gaseous fuel lines during all times, shutoff valve 135 and pressure reducer 134 may be employed proximal to the tanks 136. In this manner, the shutoff valves 135 can be directed to be open only when the ECM instructs the same, such as, for example, when the operator turns a key in anticipation of starting engine 112 or when the ECM 130 is transitioning engine 112 from running off of gasoline (in one example) at a range below a predetermined RPM level to a gaseous fuel such as LNG at a range above a predetermined RPM level. Upon turning off of the key or other operational input from operator, the primer device 158 may direct the shutoff valve 135 to open such that a suitable pressure level of gaseous fuel can fill the gaseous fuel line. The primer device 158 may direct the shutoff valve 135 to open for a predetermined period of time, which may be a short duration. Shutoff valve 135 may be biased closed. The pressure at the regulator 134 may be monitored with a high pressure signal sensor 162. In one or more embodiments, the regulated pressure should be about 45 pounds per square inch.

Positioning the shut off valve 135 proximal tank 136 provides increased safety over situations in which the shutoff valve and/or pressure reducer/regulator 134 closer to the engine injector 116, however, the length of regulated pressure gaseous line may then require priming, such as priming device 158 provided herein.

A gaseous fuel temperature sensor 164 may also be employed and in communication with the regulator 134 or gaseous fuel line. This sensor 164 may be advantageously provided in gaseous fuel situations where flow of fuel typically causes a significant reduction in temperature of the fuel and components within the fuel line. The fuel temperature sensor 164 may be in communication with ECM 130. ECM 130 may be configured to monitor the fuel temperature sensor 164 and direct a water pump 166 to pump water from a body of water 168 in an open temperature control system. Alternatively, a direct heating device such as an electric heater or the like may be provided in heat transfer proximity to the regulator 134 for providing heating to the regulator 134 to prevent freezing of the regulator when fuel is flowing.

As illustrated, two gaseous fuel tanks 136 may be provided, while in other embodiments, any desired number may be provided. This is due to, during experimental testing, it was determined that the gaseous fuel line pressure was below a desirable level during high engine RPMs and the addition of a second fuel tank 136 alleviates this issue.

A coalescing filter 170 may be provided in the gaseous fuel line. Fuel is provided through the gaseous fuel line into the gaseous fuel manifold 126 where it is split into multiple fuel lines for communicating with each gaseous injector 124. The gaseous injector 124 may be in communication with ECM 130 via sensor 132 as previously described herein.

The embodiment illustrated in FIG. 6 is one in which the adapter 10 is utilized as a plug-and-play device for being received within the injector opening of the cylinder head of an engine. As illustrated with the embodiment shown in FIG. 3, individual gaseous fuel lines may be tapped directly into the intake manifold 114.

Figure 7:
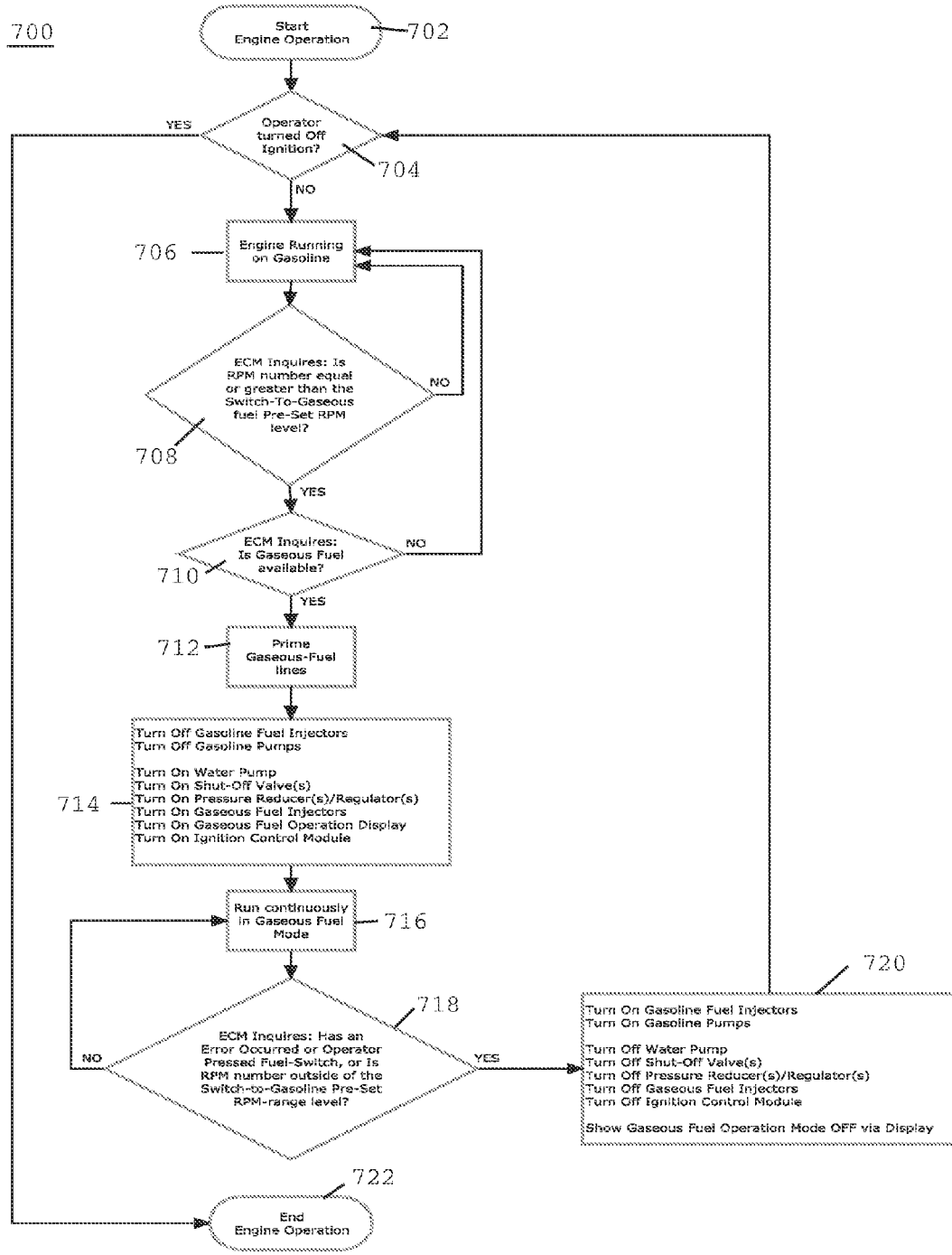
FIG. 7 is a flow chart of a method for controlling one of the systems disclosed herein according to one or more embodiments disclosed herein.

FIG. 7 illustrates one or more methods 700 disclosed herein. The method 700 may include starting engine operation 702. During start up, the engine may be started on gasoline for a gasoline based engine in the case of a retrofit in order to address the issues associated with priming a lengthy gaseous fuel line disclosed herein. The engine may be any engine disclosed herein or any engine that is provided with bi-fuel operability. The method 700 may include determining whether the operator has turned off the ignition 704. This may be accomplished at ignition control module 144 shown in FIG. 6. This step may be determined by the ECM 130. If the ignition is turned off, the ECM determines that the engine is not operating 722.

Additionally, if the ignition is not turned off, the ECM determines if the engine is running on gasoline 706. This may also include having the ECM inquire whether the RPM number is equal to or greater than the switch-to-gaseous fuel pre-set RPM level 708. In one or more embodiments, if the determined RPM level is below the switch-to-gaseous fuel pre-set RPM level, then the engine is running on gasoline, diesel, or other conventional fuel. This determination may be made by communicating with the RPM sensor 152. Alternatively, this may be monitored by other manners such as monitoring an injector pulse rate or the like. If RPMs are above the pre-set RPM level, then the ECM may direct priming of the gaseous fuel lines 712. This priming may be accomplished with primer device 158 and priming switch 160. It may be implied that if at any time during the operation of the engine, the operator turns off the ignition, then the engine turns off, regardless of the type of fuel that is using at that time.

After priming the gaseous-fuel lines, the ECM 130 may then direct turning off gasoline fuel injectors 116. The turn off of the gasoline injectors may be accomplished in the order that follows the firing order of the engine. For example, for a six cylinder engine that has a firing order 1-3-5-2-4-6, the ECM 130 may direct injector at cylinder 1 to be cut off first. Then injector at cylinder 3 follows. This may occur at the next available firing sequence, or may be offset such that the engine 112 has a period of time where cylinder 1 is running off of gaseous fuel, yet cylinders 3-5-2-4-6 are still running off of conventional liquid fuel during that offset period of time. After the offset period of time, injector 3 is cut off and that cylinder is then running off of gaseous fuel, and cylinders 5-2-4-6 are still running off of conventional liquid fuel. The procedure for the remaining cylinders will follow a similar routine.

The ECM 130 may turn off gasoline pumps. The ECM 130 may turn on water pump 166 or other heater to moderate temperature of gaseous fuel components as already described herein. The ECM 130 may turn on pressure reducer/regulators 134. The ECM 130 may turn on gaseous fuel injectors 124. These injectors 124 may be directed to a desired frequency of opening and closing by ECM 130. ECM 130 may turn on the gaseous fuel operation display 154. ECM 130 may turn on the ignition control module 144. ECM 130 may carry out each of these steps instantaneously or may have a desired order of operation. These steps are illustrated with reference to step 714.

The method then includes running continuously on gaseous fuel 716. The ECM 130 continuously monitors the RPM level to make sure that RPMs are above the pre-set RPM level and monitors whether an error has occurred or operator pressed fuel-switch 156, or is the RPM value below the pre-set RPM level. If the RPM level is above the pre-set RPM level, the engine continuously runs on gaseous fuel while the ECM continues to monitor the RPM level of the engine. If the RPM level is below the pre-set RPM level, then the ECM 130 turns on gasoline fuel injectors 116 and gasoline fuel pumps in order to allow the engine to run off of gasoline 718. The ECM 130 turns off water pump 166, shut off-valves 135, pressure reducer/regulators 134, gaseous fuel injectors 124, and ignition control module 144 720. The ECM then shows the operation display 154 in off mode.

Figure 8:
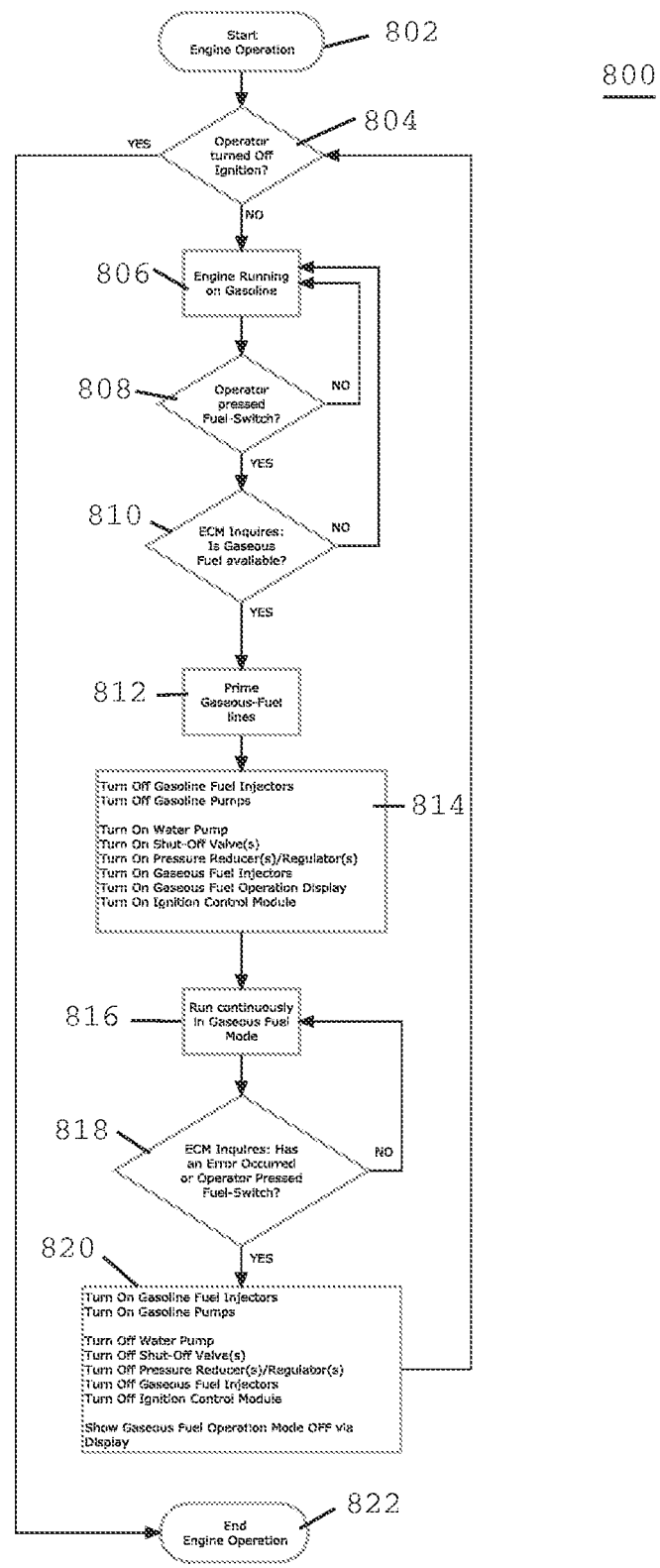
FIG. 8 is a flow chart of a method for controlling one of the systems disclosed herein according to one or more embodiments disclosed herein.

FIG. 8 illustrates a method 800 similar to the one or more methods illustrated in FIG. 7, except the operator is determining whether to and when to switch between gasoline, diesel or other conventional fuels and gaseous fuels. The method includes starting engine operation 802. Similarly, the method includes determining whether ignition is off 804. If off, then end engine operation 822. If on, then engine is running off of gasoline, diesel or other conventional fuel 806. If so, then has the operator actuated the fuel-switch 808. If no, the engine continues to run off of gas 806. If yes, then the ECM 130 determines if gaseous fuel is available 808. If gaseous fuel is available, then the operator primes the gaseous fuel supply line by activating the primer device 158 with the priming switch 160 808. Then the ECM or operator turns off the gasoline fuel injectors and gasoline pumps, and turns on the water pump, shut-off valves, pressure reducers/regulators, gaseous fuel injectors, gaseous fuel operation display, and ignition control module 814. The method then includes running continuously on gaseous fuel 816. The ECM continuously monitors an error has occurred or if the operator has pressed the fuel-switch 818. If no error or no operator pushing the fuel-switch, the engine continuously runs off of gaseous fuel 816. If yes, then the gasoline fuel injectors and gasoline pumps are turned on, the water pump, shut-off valves, pressure reducers/regulators, gaseous fuel injectors, and injection control module are turned off 820. The gaseous fuel operation mode is also displayed as off via display 154.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating there from. Therefore, the disclosed embodiments should not be limited to any single embodiment, but rather should be construed in breadth and scope in accordance with the appended claims.

What is claimed:

1. An engine assembly comprising:
    an internal combustion engine of the type having an air intake manifold and a fuel injector carried by a fuel rail in fluid communication with a cylinder head of the engine and a gasoline or diesel fuel source;
    a supply line in communication with each rail of the fuel rail and being in communication with a gaseous fuel source, the supply line further defining a valve for controlling flow of the gaseous fuel therethrough; and
    a control module for controlling the fuel injector and the valve, the control module being configured to enable the fuel injector when the engine is operating at a first predetermined operation condition and configured to enable the valve when the engine is operating at a second predetermined operation condition, wherein the first predetermined operation condition is an engine RPM below a predetermined value, wherein the control module is configured to shut off the fuel injector and actuate the valve to an open position at some time when the engine is in the second predetermined operation condition such that the engine is cranked on gasoline or diesel from the respective gasoline or diesel fuel source but runs on gaseous fuel between a desired range in the second operation condition.

2. The engine assembly according to claim 1, wherein the second predetermined operation condition is an engine RPM above a predetermined value.

3. The engine assembly according to claim 1, wherein the control module is configured to actuate the valve to vary the duration of opening to vary the amount of gaseous fuel flowing therethrough.

4. The engine assembly according to claim 1, wherein the supply line is defined at a portion of the air intake manifold closely spaced to the cylinder head.

5. The engine assembly according to claim 1, wherein the supply line is defined at a medial portion of the air intake manifold.

6. The engine assembly according to claim 5, wherein at least a portion of the gaseous fuel and air supply is intermixed in the air intake manifold.

7. The engine assembly according to claim 1, wherein the engine is a marine engine.

8. The engine assembly according to claim 1, further including an injector adapter comprising:
- a body portion defining a chamber therein and having a first end configured for being received within the engine and a second end configured engaging with the fuel injector; and
- a fuel passage inlet having a first end spaced-apart from the body portion and terminating in an opening that is configured for fluid communication with a gaseous fuel supply and a second end terminating in an inlet opening defined in the body portion, the inlet opening defining an oblong shape and terminating in the body at a position below a bottom-most portion of the injector, wherein the fuel passage inlet defines a longitudinal axis that extends at an acute angle relative to a vertical defined through the chamber of the body portion, wherein the longitudinal axis extends through the terminal first end and the terminal second end such that a connection between the fuel passage inlet and the a supply line in communication with the gaseous fuel supply when engaged therewith maintains the angle.

9. The engine assembly according to claim 1, wherein the control module is configured to communicate with a pump positioned within a supply line of the gaseous fuel and direct the pump to provide pumping forces or a pressure differential to pump the gaseous fuel along a length of the supply line in order to prime the supply line with gaseous fuel.

10. The engine assembly according to claim 1, wherein the engine has a predetermined firing order for determining the firing order of cylinders, wherein the control module is configured to direct each of the fuel injectors to cease pulsing in the predetermined firing order when the engine is operating at the second predetermined operation condition.

11. An injector adapter for use in converting an engine to use gaseous fuels and traditional liquid fuels while using the same cylinder fuel port, the adapter comprising:
- a body portion defining a chamber therein and having a first end configured for being received within the engine and a second end configured engaging with a fuel injector; and
- a fuel passage inlet having a first end spaced-apart from the body portion and terminating in an opening that is configured for fluid communication with a gaseous fuel supply and a second end terminating in an inlet opening defined in the body portion, the inlet opening defining an oblong shape and terminating in the body at a position below a bottom-most portion of the injector, wherein the fuel passage inlet defines a longitudinal axis that extends at an acute angle relative to a vertical defined through the chamber of the body portion, wherein the longitudinal axis extends through the terminal first end and the terminal second end such that a connection between the fuel passage inlet and a supply line in communication with the gaseous fuel supply when engaged therewith maintains the angle.

12. The injector adapter according to claim 11, wherein the inlet opening defines a greater width than height.

13. The injector adapter according to claim 11, wherein the fuel passage inlet is defined at a non-orthogonal angle relative to a length of the body portion.

14. The injector adaptor according to claim 11, wherein the inlet opening defines an oblong shape and terminates before a bottom-most facing portion of a gasoline injector and an angle of discharge directs substantial gaseous fuel below the bottom-most facing portion of the gasoline injector.

15. The injector adaptor according to claim 11, wherein a position in which the supply line is in communication with the gaseous fuel supply engages the injector adaptor is spaced-apart from the body portion, and positioned above a horizontal extending from an uppermost surface of the body portion to allow for increased spacing to access the position in which the supply line is in communication with the gaseous fuel.

* * * * *